(12) United States Patent
Kim et al.

(10) Patent No.: US 12,281,894 B2
(45) Date of Patent: Apr. 22, 2025

(54) WELDING ROD INSPECTION APPARATUS FOR MEASURING WHETHER WELDING ROD IS NORMAL AND INSPECTION METHOD USING THE SAME

(71) Applicant: LG ENERGY SOLUTION, LTD., Seoul (KR)

(72) Inventors: Ji Woo Kim, Daejeon (KR); Heung Kun Park, Daejeon (KR); Jung Ho Oh, Daejeon (KR); Hyeong Min Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/924,636

(22) PCT Filed: Sep. 14, 2021

(86) PCT No.: PCT/KR2021/012515
§ 371 (c)(1),
(2) Date: Nov. 10, 2022

(87) PCT Pub. No.: WO2022/085951
PCT Pub. Date: Apr. 28, 2022

(65) Prior Publication Data
US 2023/0184532 A1    Jun. 15, 2023

(30) Foreign Application Priority Data
Oct. 22, 2020    (KR) .......................... 10-2020-0137690

(51) Int. Cl.
*G01B 5/20*    (2006.01)
(52) U.S. Cl.
CPC .................................... *G01B 5/20* (2013.01)

(58) Field of Classification Search
CPC ............... G01B 5/20; G01B 5/24; G01B 5/25
(Continued)

(56) References Cited

U.S. PATENT DOCUMENTS 5,656,126 A * 8/1997 Martinez ............. B29C 66/1142
401/2
6,462,309 B1 * 10/2002 Wimroither ........... B23K 9/295
219/137.51
(Continued)

FOREIGN PATENT DOCUMENTS

CN    102564359 A    7/2012
CN    109809106 A    5/2019
(Continued)

OTHER PUBLICATIONS

International Search Report for PCT/KR2021/012515 (PCT/ISA/210) mailed on Dec. 28, 2021.

*Primary Examiner* — George B Bennett
(74) *Attorney, Agent, or Firm* — Birch, Stewart, Kolasch & Birch, LLP (57) ABSTRACT

Discussed is a welding rod inspection apparatus for measuring whether a welding rod is deformed and an inspection method using the same, and more particularly a welding rod inspection apparatus including a plurality of measures configured to be brought into contact with a predetermined position of a lower end of the welding rod and a support die configured to support the plurality of measurers. The plurality of measurers can be located so as to be spaced apart from each other by a predetermined distance, and each of the plurality of measurers or the support die can be provided with a pressure sensor configured to measure a pressure applied to the plurality of measurers. An inspection method using the plurality of measurers is also discussed.

11 Claims, 7 Drawing Sheets

(58) Field of Classification Search
USPC .......................................... 33/573, 613, 645
See application file for complete search history.

(56) References Cited

U.S. PATENT DOCUMENTS

| | | | | |
|---|---|---|---|---|
| 6,813,843 | B1* | 11/2004 | Faubion | B23Q 17/2233 33/534 |
| 7,999,243 | B2* | 8/2011 | Rosinski | G01B 21/10 250/559.19 |
| 8,297,115 | B2* | 10/2012 | Borgers | G01L 23/18 73/114.19 |
| 9,539,663 | B2* | 1/2017 | Grossauer | B23K 9/1336 |
| 9,589,481 | B2* | 3/2017 | Becker | G05B 19/128 |
| 9,757,819 | B2* | 9/2017 | Becker | G09B 19/24 |
| 2005/0198849 | A1 | 9/2005 | Goeggelmann et al. | |
| 2012/0120380 | A1 | 5/2012 | Lyons | |
| 2014/0144896 | A1* | 5/2014 | Einav | B23K 9/1274 219/124.1 |
| 2015/0190887 | A1* | 7/2015 | Becker | G09B 19/24 228/103 |
| 2016/0131597 | A1 | 5/2016 | Leuckefeld et al. | |
| 2016/0303681 | A1 | 10/2016 | Lee | |
| 2019/0128819 | A1 | 5/2019 | Zeppenfeld et al. | |
| 2019/0265015 | A1 | 8/2019 | Michiwaki | |
| 2020/0276674 | A1* | 9/2020 | Lee | B23K 31/125 |
| 2021/0170515 | A1* | 6/2021 | Oh | B23K 9/24 |
| 2021/0394293 | A1* | 12/2021 | Kang | B23K 9/02 |
| 2024/0058902 | A1* | 2/2024 | Masuyama | B23K 35/308 |

FOREIGN PATENT DOCUMENTS

| | | |
|---|---|---|
| CN | 109855591 A | 6/2019 |
| CN | 111578876 A | 8/2020 |
| DE | 93 01 457 U1 | 6/1993 |
| JP | 2000-258148 A | 9/2000 |
| JP | 2000-288733 A | 10/2000 |
| JP | 2002-5644 A | 1/2002 |
| JP | 2007-167945 A | 7/2007 |
| JP | 2012-218025 A | 11/2012 |
| JP | 2019-195815 A | 11/2019 |
| KR | 1994-0008590 B1 | 9/1994 |
| KR | 10-1278543 B1 | 6/2013 |
| KR | 10-1481373 B1 | 1/2015 |
| KR | 10-2016-0123887 A | 10/2016 |
| KR | 10-1836081 B1 | 3/2018 |
| KR | 10-2019-0114107 A | 10/2019 |
| TW | 200636212 A | 10/2006 |
| TW | 201109620 A1 | 3/2011 |
| TW | 201614186 A | 4/2016 |
| TW | 201823665 A | 7/2018 |

* cited by examiner

WELDING ROD INSPECTION APPARATUS FOR MEASURING WHETHER WELDING ROD IS NORMAL AND INSPECTION METHOD USING THE SAME

TECHNICAL FIELD

This application claims the benefit of priority to Korean Patent Application No. 2020-0137690 filed on Oct. 22, 2020, the disclosure of which is incorporated herein by reference in its entirety.

The present invention relates to a welding rod inspection apparatus for measuring whether a welding rod is normal and an inspection method using the same, and more particularly to a welding rod inspection apparatus for measuring whether a welding rod is normal that is capable of measuring whether the welding rod is normal in order to reduce a defect rate occurring at the time of welding work using the welding rod and an inspection method using the same.

BACKGROUND ART

With recent development of alternative energies due to air pollution and energy depletion caused as the result of use of fossil fuels, demand for secondary batteries capable of storing electrical energy that is produced has increased. The secondary batteries, which are being capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

Meanwhile, a plurality of battery cells is connected to each other in order to provide energy required by a device. At this time, the battery cells are connected to each other by welding using a busbar. As a result, a welding rod with which a plurality of welding operations has been performed may be deformed, for example eccentric, which may lead to defects of a battery module or a battery pack.

Figure 1:
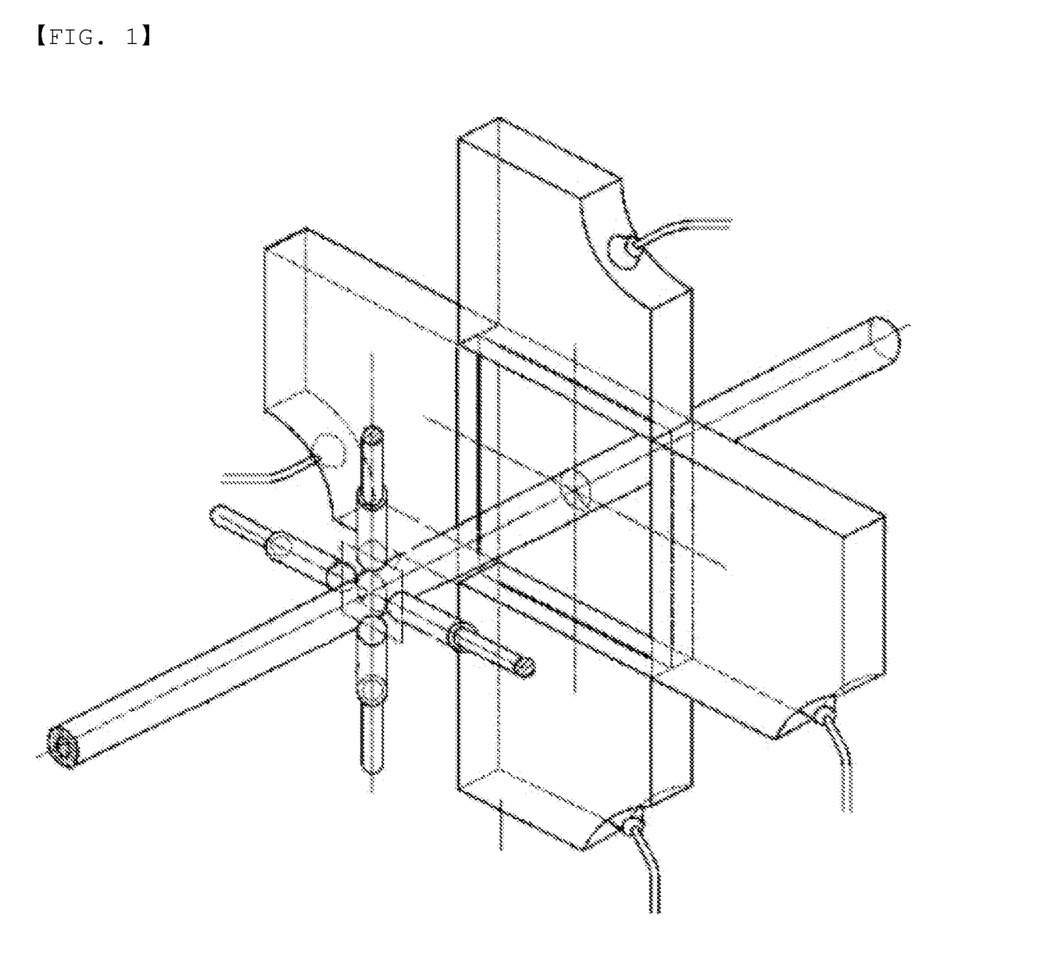
FIG. 1 is a perspective view showing a conventional welding rod eccentricity detection apparatus.

FIG. 1 is a perspective view showing a conventional welding rod eccentricity detection apparatus. As shown in FIG. 1, the conventional welding rod eccentricity detection apparatus includes an eddy current type distance sensor configured to measure the position of a core of a welding rod using electromagnetic induction, a laser position meter configured to measure the position of the welding rod, a measurement controller configured to determine eccentricity of the welding rod based on information detected by the measurement means, and a monitoring circuit.

As can be seen from the above description, the conventional welding rod eccentricity detection apparatus has an advantage in that the eccentric state of the welding rod is checked using the detection apparatus and, when abnormality occurs, the same is reported through the monitoring circuit, whereby it is possible to check the state of the welding rod.

However, the conventional welding rod eccentricity detection apparatus has problems in that the structure of the detection apparatus is complicated, and only the eccentric state of the welding rod is determined, but it is difficult to determine a bending phenomenon of the welding rod or deformation occurring at an end surface of the welding rod, such as wear.

Prior Art Document (Patent Document 1) Japanese Patent Application Publication No. 2002-005644

DISCLOSURE

Technical Problem

The present invention has been made in view of the above problems, and it is an object of the present invention to provide a welding rod inspection apparatus that has a simple structure and is capable of inspecting the eccentric state of a welding rod and various kinds of deformation of the welding rod, such as bending and wear, thereby maintaining a predetermined level of welding quality, and an inspection method using the same.

Technical Solution

In order to accomplish the above object, a welding rod inspection apparatus for inspecting whether a welding rod is normal according to the present invention includes a plurality of measurers configured to be brought into contact with a predetermined position of a lower end of the welding rod and a support die configured to support the plurality of measurers, wherein the plurality of measurers is located so as to be spaced apart from each other by a predetermined distance, and each of the plurality of measurers or the support die is provided with a pressure sensor configured to measure a pressure applied to each of the plurality of measurers.

Also, in the welding rod inspection apparatus according to the present invention, the plurality of measurers may include a first measurer, including a first contact portion and a first support shaft, and a second measurer, including a second contact portion and a second support shaft, and the pressure sensor may be mounted in each of the first contact portion and the second contact portion.

Also, in the welding rod inspection apparatus according to the present invention, each of the first contact portion and the second contact portion may be formed in a conical shape having a width gradually decreasing towards a tip of each of the first contact portion and the second contact portion.

Also, in the welding rod inspection apparatus according to the present invention, each of the first contact portion and the second contact portion may have an oval shape that is in a longitudinal direction of each of the first contact portion and the second contact portion.

Also, in the welding rod inspection apparatus according to the present invention, each of the first contact portion and the second contact portion may have a cylindrical shape.

Also, in the welding rod inspection apparatus according to the present invention, the distance between the first contact portion and the second contact portion brought into contact with the lower end of the welding rod may be equal to or less than the diameter of the welding rod.

In addition, an inspection method using the welding rod inspection apparatus according to the present invention includes locating the first measurer and the second measurer at predetermined coordinates, locating a welding rod vertically above the first measurer and the second measurer, moving the first measurer and the second measurer or the welding rod to a predetermined position in a vertical direction, and measuring pressures of the first measurer and the second measurer.

Also, in the inspection method using the welding rod inspection apparatus according to the present invention, when the pressures of the first measurer and the second measurer deviate from a first predetermined range, a determination may be made that the welding rod is abnormal.

Also, in the inspection method using the welding rod inspection apparatus according to the present invention, when each of the pressures of the first measurer and the second measurer exceeds 0 Pa and a difference in the pressure between the first measurer and the second measurer deviates from a second predetermined range, a determination may be made that the welding rod is bent or an end surface of the welding rod is deformed.

Also, in the inspection method using the welding rod inspection apparatus according to the present invention, when one of the pressures of the first measurer and the second measurer exceeds 0 Pa and the other pressure is 0 Pa, a determination may be made that the welding rod is eccentric.

Advantageous Effects

As is apparent from the above description, a welding rod inspection apparatus for measuring whether a welding rod is normal according to the present invention and an inspection method using the same have a merit in that a pair of measurement units spaced apart from each other by a predetermined distance and pressure sensors are provided, whereby the structure of the welding rod inspection apparatus is very simple.

In addition, the welding rod inspection apparatus for measuring whether the welding rod is normal according to the present invention and the inspection method using the same have an advantage in that it is possible to determine whether the welding rod is bent or an end surface of the welding rod is deformed as well as eccentricity of the welding rod, whereby it is possible to reduce a welding defect rate of a battery module or a battery pack.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a welding rod inspection apparatus for measuring whether a welding rod is normal according to the present invention and an inspection method using the same will be described with reference to the accompanying drawings.

Figure 2:
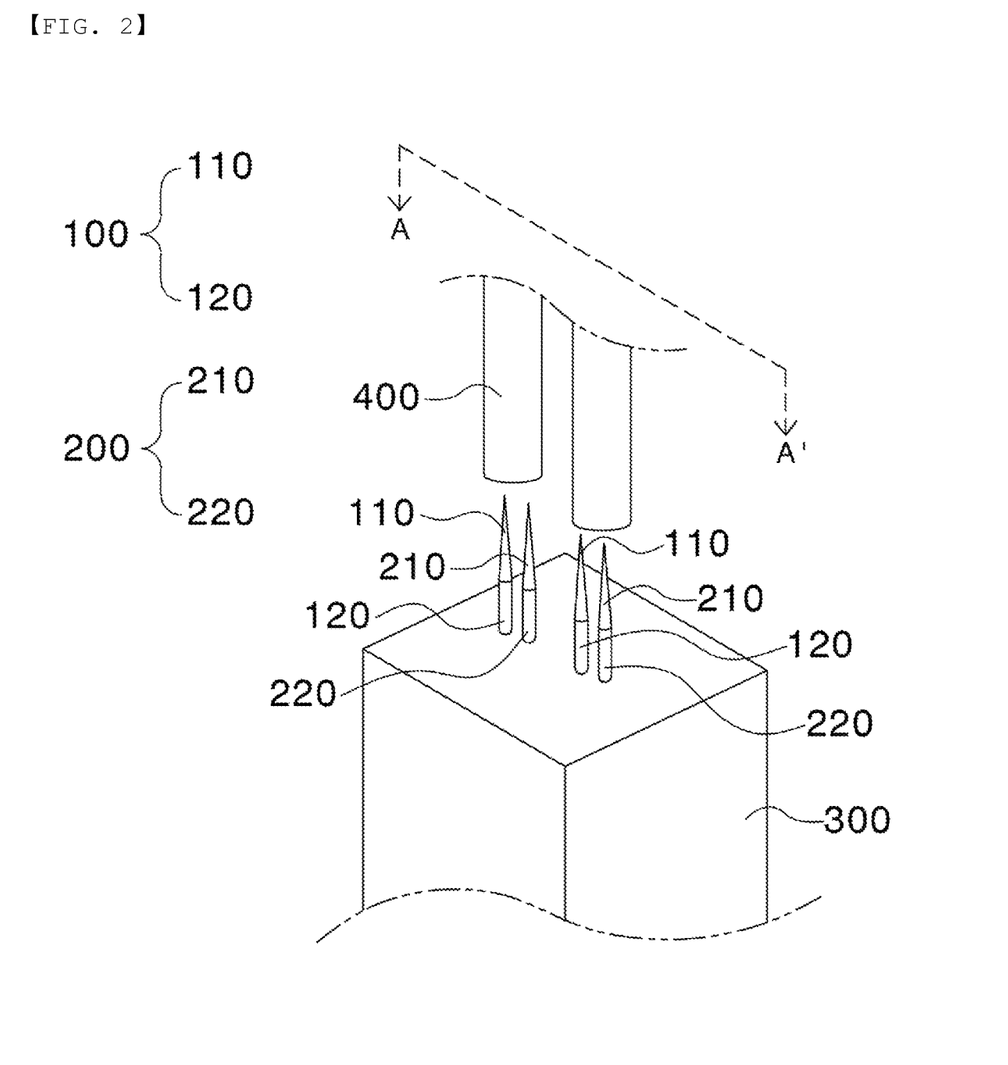
FIG. 2 is a perspective view of a welding rod inspection apparatus according to a first preferred embodiment of the present invention.
Figure 3:
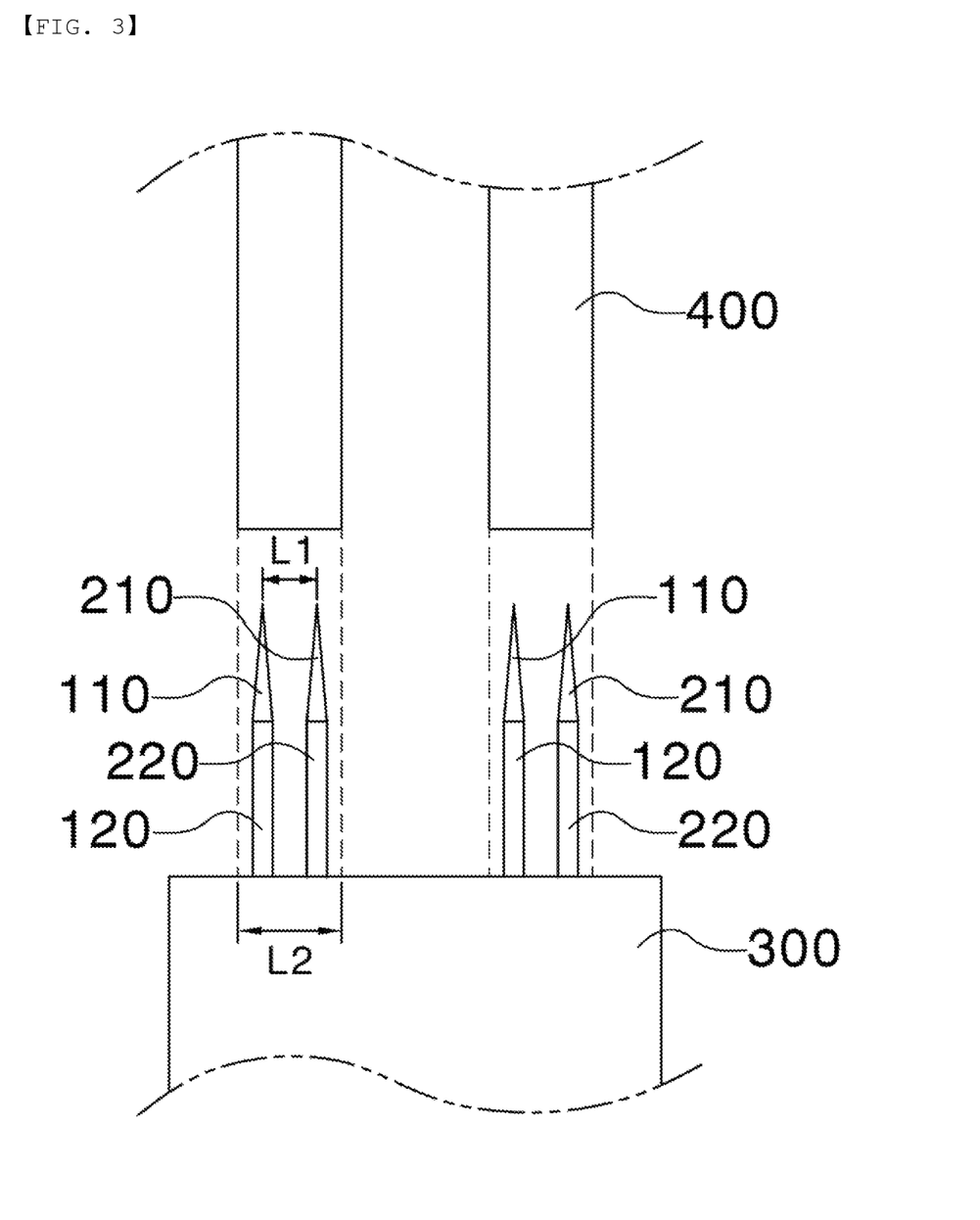
FIG. 3 is a sectional view of the welding rod inspection apparatus taken along line A-A' of FIG. 2.

FIG. 2 is a perspective view of a welding rod inspection apparatus according to a first preferred embodiment of the present invention, and FIG. 3 is a sectional view of the welding rod inspection apparatus taken along line A-A' of FIG. 2.

Referring to FIGS. 2 and 3, the welding rod inspection apparatus according to the present invention includes a first measurement unit 100, a second measurement unit 200, and a support die 300.

In the attached drawings, two measurement units, each of which includes a first measurement unit 100 and a second measurement unit 200, are located side by side, which, however, is merely an example. A single measurement unit may be provided, or three or more measurement units may be continuously arranged in a state of being spaced apart from each other by a predetermined distance.

First, the first measurement unit 100 includes a first contact portion 110 and a first support shaft 120 configured to support the first contact portion 110.

The first contact portion 110 is a portion that comes into close contact with a lower end of a welding rod 400 at the time of inspection. As an example, the first contact portion may be formed in a conical shape having a width gradually decreasing upwards.

Here, a pressure sensor (not shown) configured to measure pressure when the first contact portion 110 comes into close contact with the welding rod 400 is mounted in the first contact portion 110.

The first support shaft 120 is connected to the support die 300 in a state of being located under the first contact portion 110. The first measurement unit 100, which is constituted by the first contact portion 110 and the first support shaft 120, is capable of being moved in a vertical direction by a known driving means (not shown).

Next, the second measurement unit 200 includes a second contact portion 210 and a second support shaft 220 configured to support the second contact portion 210.

Here, the second contact portion 210 and the second support shaft 220 are identical in construction to the first contact portion 110 and the first support shaft 120, respectively, and therefore a duplicate description thereof will be omitted.

Next, the support die 300 will be described. The support die 300 is located under the first measurement unit 100 and the second measurement unit 200, and supports the first measurement unit 100 and the second measurement unit 200. Meanwhile, a driving means (not shown) configured to move the first measurement unit and the second measurement unit upwards and downwards in the vertical direction is mounted in the support die.

Although not shown in the drawings, therefore, it is obvious that the support die 300 is provided therein with a space in which the first measurement unit 100 and the second measurement unit 200 are moved upwards and downwards and the driving means is received.

The first measurement unit 100 and the second measurement unit 200 located so as to protrude above the support die 300 are spaced apart from each other by a predetermined distance in order to constitute a single measurement unit. At this time, it is preferable for the distance L1 between the upper ends of the first contact portion 110 and the second contact portion 120, i.e. the ends of the first contact portion and the second contact portion that abut the welding rod 400, to be equal to or less than the diameter L2 of the welding rod such that eccentricity of the welding rod 400, a bending phenomenon of the welding rod, or whether the end surface of the welding rod is deformed can be determined.

Meanwhile, in the above description, the pressure sensor is mounted in the contact portion; however, the present invention is not limited thereto.

For example, the pressure sensor may be provided at the support shaft, may be provided between the contact portion and the support shaft, or may be provided at a lower end of the support shaft. That is, the position of the pressure sensor is not particularly restricted as long as it is possible to measure pressure when the welding rod 400 and the measurement unit come into tight contact with each other.

Figure 4:
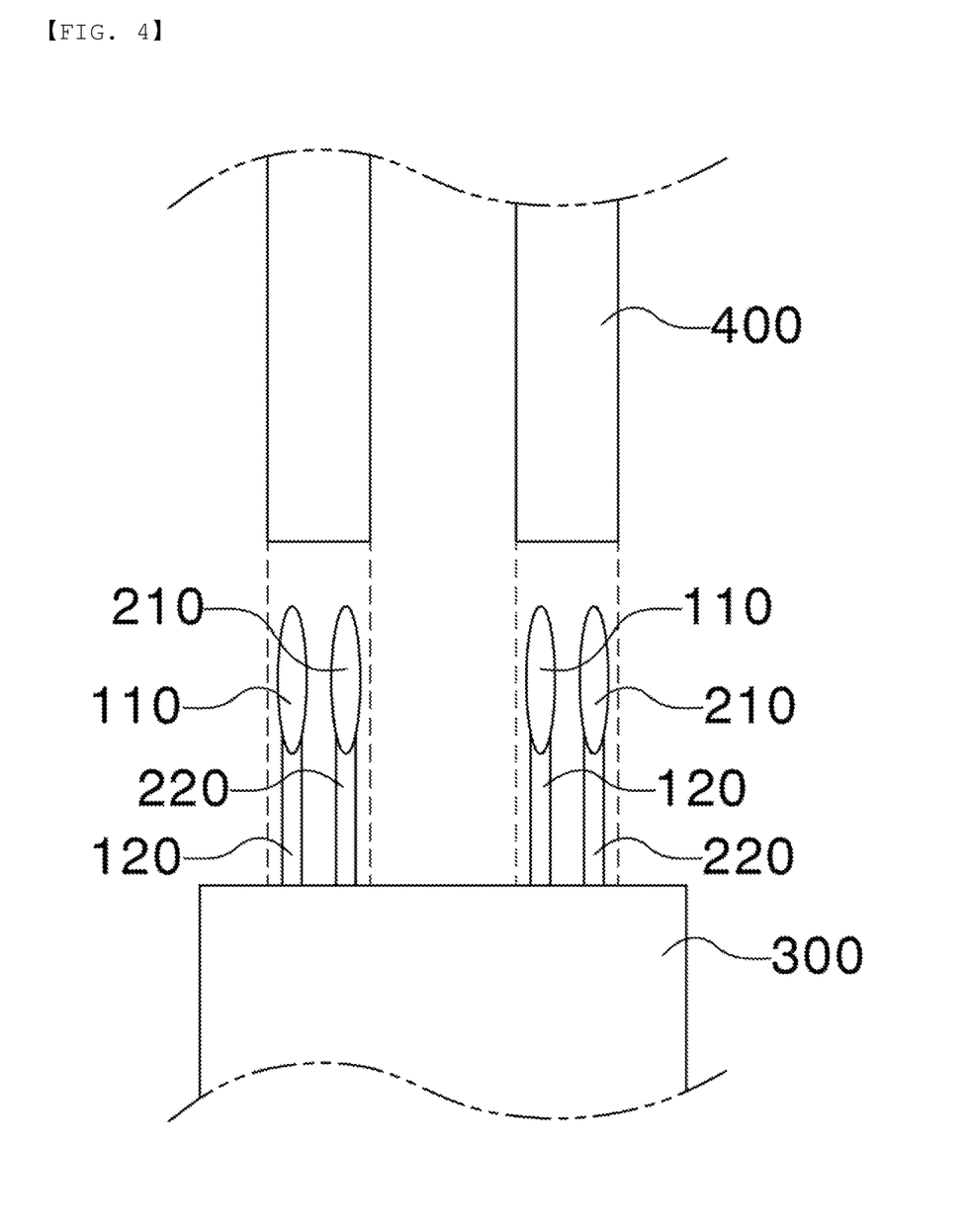
FIG. 4 is a sectional view of a welding rod inspection apparatus according to a second preferred embodiment of the present invention.

FIG. 4 is a sectional view of a welding rod inspection apparatus according to a second preferred embodiment of the present invention. Referring to FIG. 4, the welding rod inspection apparatus according to the second embodiment is identical to the welding rod inspection apparatus according to the first embodiment described with reference to FIGS. 2 and 3 except that the shape of each of the first contact portion 110 and the second contact portion 210 is an oval shape that is long up and down, and therefore a description of the same construction will be omitted.

Figure 5:
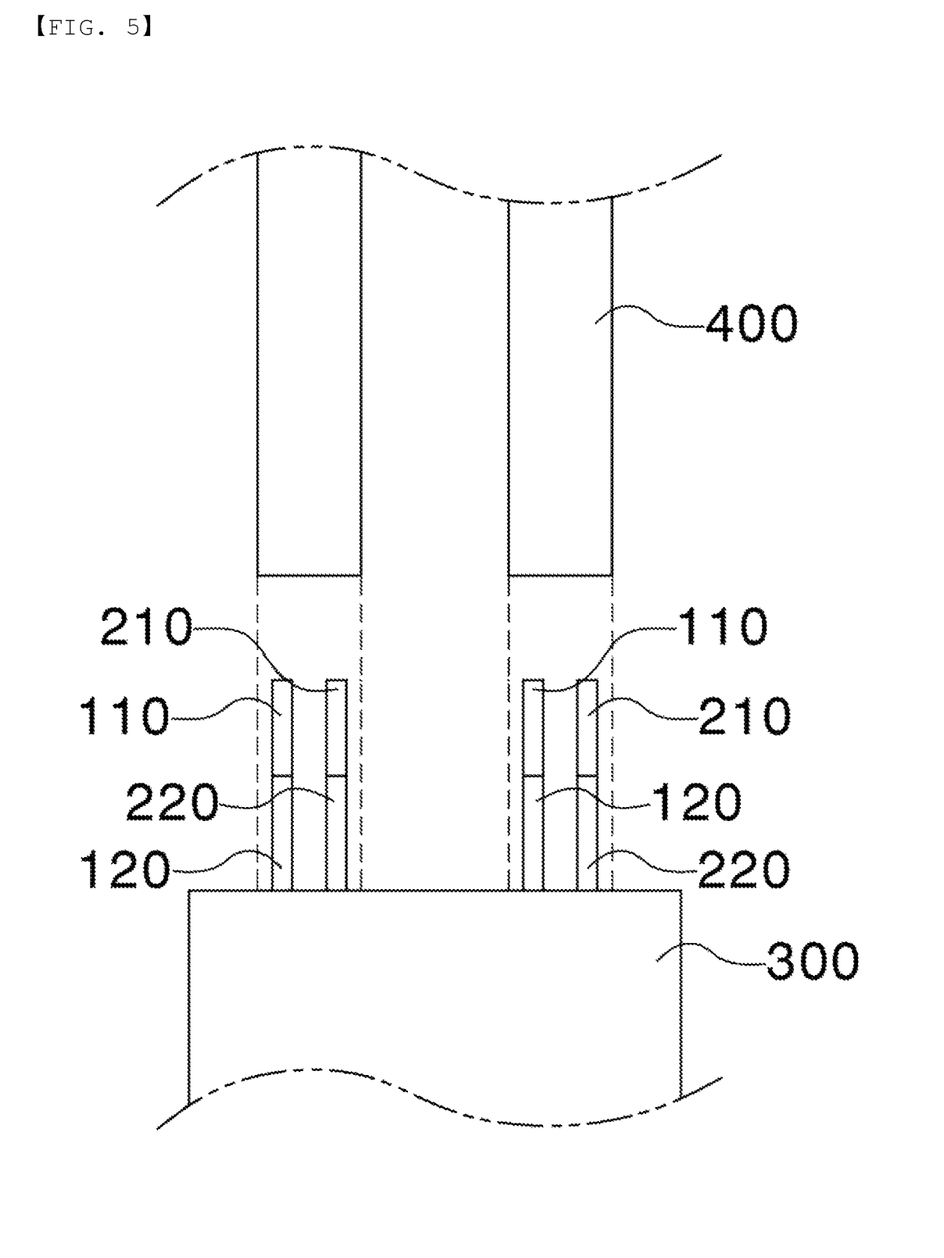
FIG. 5 is a sectional view of a welding rod inspection apparatus according to a third preferred embodiment of the present invention.

FIG. 5 is a sectional view of a welding rod inspection apparatus according to a third preferred embodiment of the present invention. Referring to FIG. 5, the welding rod inspection apparatus according to the third embodiment is identical to the welding rod inspection apparatus according to the first embodiment described with reference to FIGS. 2 and 3 except that the shape of each of the first contact portion 110 and the second contact portion 210 is an oval cylindrical shape, and therefore a description of the same construction will be omitted.

Next, a method of inspecting a welding rod using the welding rod inspection apparatus according to the present invention will be described.

An inspection method of determining whether a welding rod is normal according to the present invention includes a first step of locating the first measurement unit 100 and the second measurement unit 200 at predetermined coordinates, a second step of locating a welding rod vertically above the first measurement unit 100 and the second measurement unit 200, a third step of moving the first measurement unit 100 and the second measurement unit 200 or the welding rod 400 to a predetermined position in a vertical direction, a fourth step of measuring pressures of the first measurement unit 100 and the second measurement unit 200, and a fifth step of determining whether the welding rod 400 is normal based on the result of measurement.

Figure 6:
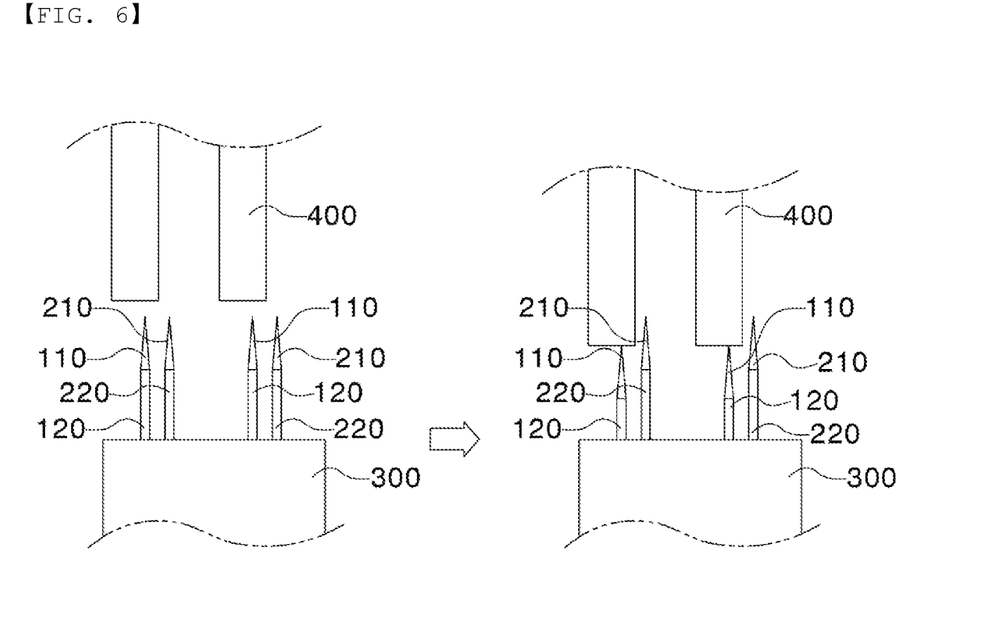
FIG. 6 is a sectional view showing checking whether a welding rod is eccentric using the welding rod inspection apparatus according to the present invention.

FIG. 6 is a sectional view showing checking whether a welding rod is eccentric using the welding rod inspection apparatus according to the present invention. A method of checking whether welding rod is eccentric will be described with reference to FIG. 6. After the first measurement unit 100 and the second measurement unit 200 are located at predetermined coordinates, the first measurement unit 100 and the second measurement unit 200 are moved upwards until the first measurement unit 100 and the second measurement unit 200 come into tight contact with a lower end surface of the welding rod 400.

When pressures measured by the first measurement unit 100 and the second measurement unit 200 are equal to each other or are different from each other within an error range, a determination is made that the welding rod 400 is normal.

However, when one of the pressures of the first measurement unit 100 and the second measurement unit 200 exceeds 0 Pa and the other pressure is 0 Pa, a determination may be made that the welding rod 400 is eccentric, and therefore a process of readjusting the coordinates of the welding rod 400 is performed.

Meanwhile, in the above description, the first measurement unit 100 and the second measurement unit 200 are moved for inspection in the state in which the welding rod 400 is stationary. Alternatively, the welding rod 400 may be moved downwards for inspection in the state in which the first measurement unit 100 and the second measurement unit 200 are stationary, or the first measurement unit 100, the second measurement unit 200, and the welding rod 400 may be simultaneously moved in the vertical direction for inspection.

Figure 7:
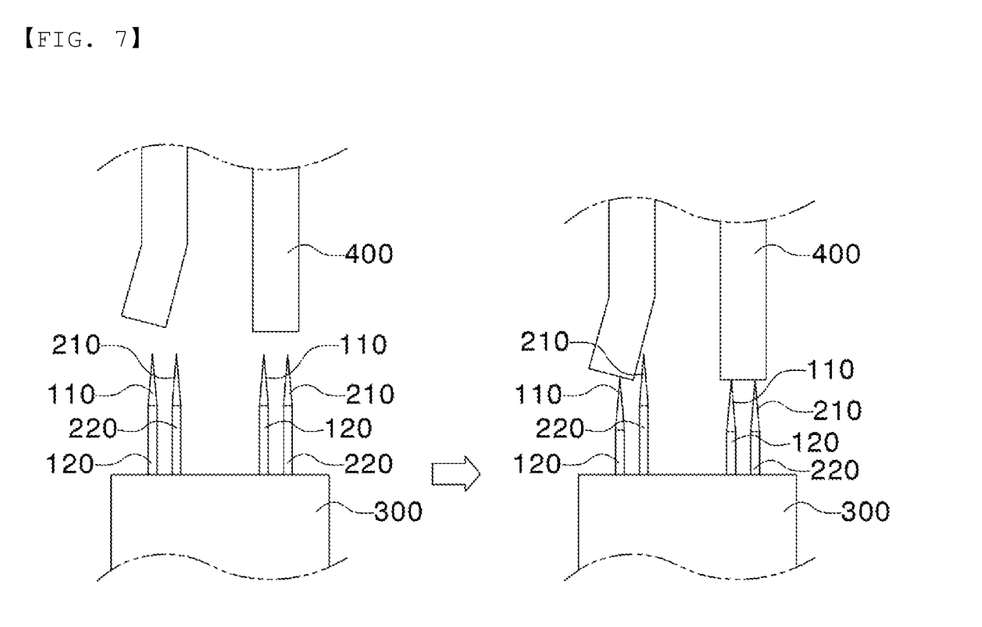
FIG. 7 is a sectional view showing checking a bending phenomenon of a welding rod using the welding rod inspection apparatus according to the present invention.
Figure 8:
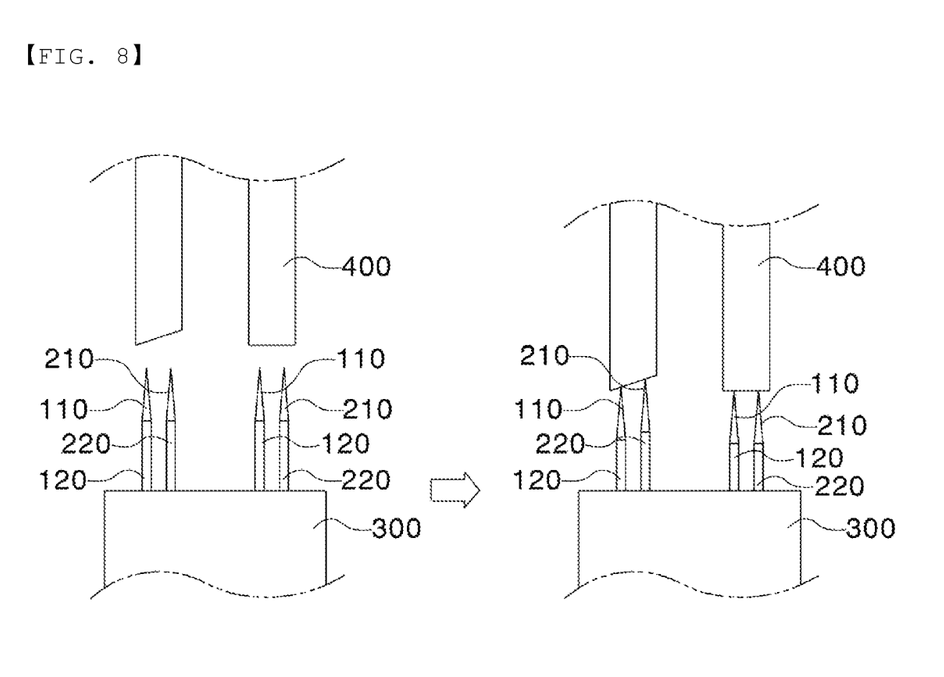
FIG. 8 is a sectional view showing checking a deformed state of the end surface of a welding rod using the welding rod inspection apparatus according to the present invention.

FIG. 7 is a sectional view showing checking a bending phenomenon of a welding rod using the welding rod inspection apparatus according to the present invention, and FIG. 8 is a sectional view showing checking a deformed state of the end surface of a welding rod using the welding rod inspection apparatus according to the present invention.

A method of checking a bending phenomenon of a welding rod or whether the end surface of a welding rod is deformed will be described with reference to FIGS. 7 and 8. After the first measurement unit 100 and the second measurement unit 200 are located at predetermined coordinates, the first measurement unit 100 and the second measurement unit 200 are moved upwards until the first measurement unit 100 and the second measurement unit 200 come into tight contact with a lower end surface of the welding rod 400.

When pressures measured by the first measurement unit 100 and the second measurement unit 200 are equal to each other or are different from each other within an error range, a determination is made that the welding rod 400 is normal.

However, when one of the pressures of the first measurement unit 100 and the second measurement unit 200 exceeds 0 Pa and the other pressure is 0 Pa, a determination may be made that the welding rod 400 is eccentric, and therefore the welding rod 400 is replaced or an end surface grinding process is performed.

Those skilled in the art to which the present invention pertains will appreciate that various applications and modifications are possible within the category of the present invention based on the above description.

DESCRIPTION OF REFERENCE SYMBOLS

100: First measurement unit
110: First contact portion
120: First support shaft
200: Second measurement unit
210: Second contact portion
220: Second support shaft
300: Support die
400: Welding rod
L1: Distance between first contact portion and second contact portion
L2: Diameter of welding rod

The invention claimed is:

1. A welding rod inspection apparatus for inspecting whether a welding rod is normal, the welding rod inspection apparatus comprising:
   a plurality of measurers configured to be brought into close contact with a predetermined position of a lower end of the welding rod; and
   a support die configured to support the plurality of measurers,
   wherein the plurality of measurers are located so as to be spaced apart from each other by a predetermined distance, and
   wherein each of the plurality of measurers or the support die is provided with a pressure sensor configured to measure a pressure applied to each of the plurality of measurers.

2. The welding rod inspection apparatus according to claim 1, wherein the plurality of measurers comprise;
   a first measurer comprising a first contact portion and a first support shaft; and
   a second measurer comprising a second contact portion and a second support shaft, and
   wherein the pressure sensor is mounted in each of the first contact portion and the second contact portion.

3. The welding rod inspection apparatus according to claim 2, wherein each of the first contact portion and the second contact portion is formed in a conical shape having a width gradually decreasing towards a tip of each of the first contact portion and the second contact portion.

4. The welding rod inspection apparatus according to claim 2, wherein each of the first contact portion and the second contact portion has an oval shape that is long in a longitudinal direction of each of the first contact portion and the second contact portion.

5. The welding rod inspection apparatus according to claim 2, wherein each of the first contact portion and the second contact portion has a cylindrical shape.

6. The welding rod inspection apparatus according to claim 2, wherein a distance between the first contact portion and the second contact portion when brought into contact with the lower end of the welding rod is equal to or less than a diameter of the welding rod.

7. A method of inspecting whether the welding rod is normal using the welding rod inspection apparatus according to claim 2, the method comprising:
   locating the first measurer and the second measurer at predetermined coordinates;
   locating the welding rod vertically above the first measurer and the second measurer;
   moving the first measurer and the second measurer or the welding rod to a predetermined position in a vertical direction; and
   measuring pressures of the first measurer and the second measurer.

8. The method according to claim 7, wherein, when the pressures of the first measurer and the second measurer deviate from a first predetermined range, a determination is made that the welding rod is abnormal.

9. The method according to claim 8, wherein, when each of the pressures of the first measurer and the second measurer exceeds 0 Pa and a difference in the pressure between the first measurer and the second measurer deviates from a second predetermined range, a determination is made that the welding rod is bent or an end surface of the welding rod is deformed.

10. The method according to claim 8, wherein, when one of the pressures of the first measurer and the second measurer exceeds 0 Pa and the other pressure is 0 Pa, a determination is made that the welding rod is eccentric.

11. The welding rod inspection apparatus according to claim 2, wherein first measurer and the second measurer are configured to move in a direction relative to the other.

* * * * *